United States Patent
Liang et al.

(10) Patent No.: US 8,073,634 B2
(45) Date of Patent: Dec. 6, 2011

(54) METHOD TO EXTRACT TARGET SIGNALS OF A KNOWN TYPE FROM RAW DATA CONTAINING AN UNKNOWN NUMBER OF TARGET SIGNALS, INTERFERENCE, AND NOISE

(75) Inventors: Ming Liang, Orleans (CA); Tet Hin Yeap, Ottawa (CA); Xianfeng Fan, Edmonton (CA); Iman Soltani Bozchalooi, Gatineau (CA)

(73) Assignee: University of Ottawa, Ottawa, Ontario (CA)

( * ) Notice: Subject to any disclaimer, the term of this patent is extended or adjusted under 35 U.S.C. 154(b) by 616 days.

(21) Appl. No.: 12/235,008

(22) Filed: Sep. 22, 2008

(65) Prior Publication Data

US 2010/0076693 A1 Mar. 25, 2010

(51) Int. Cl.
*G06F 19/00* (2006.01)
(52) U.S. Cl. ............. 702/22; 702/193; 367/87; 367/93; 367/135; 367/131; 367/136; 73/602
(58) Field of Classification Search .................... 706/15; 702/22, 193; 367/87, 93, 135, 100, 90, 91, 367/131, 136; 73/602; 342/90, 27, 89, 159, 342/175, 195
See application file for complete search history.

(56) References Cited

U.S. PATENT DOCUMENTS

| | | | | |
|---|---|---|---|---|
| 4,608,569 A * | 8/1986 | Dickey et al. | ................ | 342/384 |
| 4,829,306 A * | 5/1989 | Gjessing et al. | .............. | 342/159 |
| 4,847,817 A * | 7/1989 | Au et al. | ........................ | 367/135 |
| 5,091,890 A * | 2/1992 | Dwyer | ............................ | 367/99 |
| 5,128,679 A * | 7/1992 | Moffat | ............................. | 342/13 |
| 5,381,362 A * | 1/1995 | Shen et al. | .................... | 708/819 |
| 6,310,963 B1 * | 10/2001 | Erdol et al. | .................... | 382/103 |
| 6,894,639 B1 * | 5/2005 | Katz | ................................ | 342/90 |
| 6,944,225 B2 * | 9/2005 | Li | ............................. | 375/240.19 |
| 7,283,231 B2 * | 10/2007 | Brady et al. | .................. | 356/326 |
| 7,478,041 B2 * | 1/2009 | Ichikawa et al. | .............. | 704/233 |
| 7,912,113 B2 * | 3/2011 | Sayana et al. | ................. | 375/142 |
| 2002/0054694 A1 * | 5/2002 | Vachtsevanos et al. | ....... | 382/111 |
| 2007/0100615 A1 * | 5/2007 | Gotanda et al. | ............... | 704/226 |
| 2007/0205937 A1 * | 9/2007 | Thompson et al. | ............ | 342/22 |
| 2008/0316464 A1 * | 12/2008 | Luo et al. | ..................... | 356/5.01 |
| 2009/0055170 A1 * | 2/2009 | Nagahama | .................... | 704/226 |

(Continued)

OTHER PUBLICATIONS

Isreal Cohen, Shalom Raz and David Malar; "Translation-Invariant Denoising Using the Minimum Description Length Criterion"; Signal Processing—Elsevier Science B.V. (1999); vol. 75, pp. 201-223.

(Continued)

*Primary Examiner* — Carol Tsai
(74) *Attorney, Agent, or Firm* — Norton Rose OR LLP

(57) ABSTRACT

A signal analysis method extracts transient target signals of known type from a raw data source signal that contains an unknown number of target signals. The method can enhance the analysis of data obtained from in-line oil-debris sensors. The method comprises steps of: defining signatures of the known target signal, and of at least one of the intrinsic noise and interfering signals; performing a mathematical transform that decomposes the raw data into distinct data sets; using the signal signatures to identify and nullify the data sets containing noise and interfering signal signatures; using the target signal signatures to identify the data sets containing target signal components, or may further use a thresholding rule to remove intrinsic noise from said data sets, and finally applying the inverse transform to the processed data sets in order to reconstruct an enhanced output signal.

15 Claims, 11 Drawing Sheets

U.S. PATENT DOCUMENTS

2009/0092178 A1* 4/2009 Sayana et al. ............... 375/227

OTHER PUBLICATIONS

I. Daubechies, "Ten Lectures on Wavelets"; Society for Industrial and Applied Mathematics; Capital City Press, Montpelier, VA (1992); pp. 194-202.

Jerry L. Miller and Duka Kitaljevich; "In-Line Oil Debris Monitor for Aircraft Engine Condition Assessment"; Proc. 2000 IEEE Aerospace Conf. (2000); vol. 6, pp. 49-56.

Yuang-Cherng Chiou, Rong-Tsong Lee and Chih-Yih Tsai; "An On-Line Hall-Effect Device for Monitoring Wear Particle in Oils"; Wear—Elsevier Science S.A. (1998); vol. 223, No. 1-2, pp. 44-49.

Yonghui Yin, Weihua Wang, Xinpin Yan, Hanliang Xiao and Chengtao Wang; "An Integrated On-Line Oil Analysis Method for Condition Monitoring"; Measurement Science and Technology—Institute of Physics Publishing (2003); vol. 14, No. 11, pp. 1973-1977.

David L. Donoho and Iain M. Johnstone; "Ideal Spatial Adaptation by Wavelet Shrinkage"; Biometrika; Great Britain (1994); vol. 81, pp. 425-455.

David L. Donoho; "De-Noising by Soft-Thresholding"; IEEE Transactions on Information Theory (1995); vol. 41, No. 3, pp. 613-627.

S.G. Nikolov, H. Hutter and M. Grasserbauer; "De-Noising of SIMS Images Via Wavelet Shrinkage"; Chemometrics and Intelligent Laboratory Systems—Elsevier Science B.V. (1996); vol. 34, No. 2, pp. 263-273.

Hong-Tzer Yang and Chiung-Chou Liao; "A De-Noising Scheme for Enhancing Wavelet-Based Power Quality Monitoring System"; IEEE Transactions on Power Delivery (2001); vol. 16, No. 3, pp. 353-360.

J.J. Galiana-Merino, J. Rosa-Herranz, J. Giner, S. Molina and F. Botella; "De-Noising of Short-Period Seismograms by Wavelet Packet Transform"; Bulletin of the Seismological Society of America (2001); vol. 93, No. 6, pp. 2554-2562.

W. Shengqian, Z. Yuanhua and Z. Daowen; "Adaptive Shrinkage De-Noising Using Neighbourhood Characters"; Electronic Letters (2002); vol. 38, No. 11, pp. 502-503.

Philippe Ravier and Pierre-Olivier Amblard; "Wavelet Packets and De-Noising Based on Higher-Order-Statistics for Transient Detection"; Signal Processing—Elsevier Science B.V. (2001); vol. 81, No. 9, pp. 1909-1926.

Jean-Christophe Pesquet, Hamid Krim and Nerve Carfantan; "Time-Invariant Orthonormal Wavelet Representations"; IEEE Transactions on Signal Processing (1996); vol. 44, No. 8, pp. 1964-1970.

R.R. Coifman and D.L. Donoho; "Translation-Invariant De-Noising"; (1994) New York, Springer, pp. 1-26.

C. Pachaud, R. Salvetat and C. Fray; "Crest Factor and Kurtosis Contributions to Identify Defects Inducing Periodical Impulsive Forces"; Mechanical Systems and Signal Processing (1997); vol. 11, No. 6, pp. 903-916.

J.P. Dron, F. Bolaers and I. Rasolofondraibe; "Improvement of the Sensitivity of the Scalar Indicators (Crest Factor, Kurtosis) Using a De-Noising Method by Spectral Subtraction: Application to the Detection of Defects in Ball Bearings"; Journal of Sound and Vibration—Academic Press—Elsevier Ltd. (2004); vol. 270, No. 1-2, pp. 61-73.

P. Goupillaud, A Grossmann and J. Morlet; "Cycle-Octave and Related Transforms in Seismic Signal Analysis"; Geoexploration—Elseveir Science Publishers B.V. (1984/1985); Amsterdam; vol. 23, No. 1, pp. 85-102.

Olivier Rioul and Martin Vetterli; "Wavelets and Signal Processing"; IEEE Signal Processing Magazine (1991); vol. 8, No. 4, pp. 14-38.

Mark J. Shensa; "The Discrete Wavelet Tranform: Wedding the À Trous and Mallat Algorithms"; IEEE Transactions on Signal Processing (1992); vol. 40, No. 10, pp. 2464-2482.

Stephane G. Mallat; "A Theory for Multiresolution Signal Decomposition: The Wavelet Representation"; IEEE Transactions on Pattern Analysis and Machine Intelligence (1989); vol. 11, No. 7, pp. 674-693.

X.H. Wang, Robert S.H. Istepanian and Yong Hua Song; "Microarray Image Enhancement by Denoising Using Stationary Wavelet Transform"; IEEE Transactions on Nanobioscience (2003); vol. 2, No. 4, pp. 184-189.

Quan Pan, Lei Zhang, Guanzhong Dai and Hongcai Zhang; "Two Denoising Methods by Wavelet Transform"; IEEE Transactions on Signal Processing (1999); vol. 47, No. 12, pp. 3401-3406.

M. Misiti, Y. Misiti, G. Oppenheim and J.M. Poggi; "Wavelet Toolbox Users Guide Version 3.1 (R2006)"; The MathWorks (2006).

Ingrid Daubechies; "Ten Lectures on Wavelets"; copyright Society for Industrial and Applied Mathematics, Capital City Press, Montpelier, VA (1992); Chapter 6, pp. 194-202.

Masafumi Fujii and Wolfgang J.R. Hoefer; "Disperson of Time Domain Wavelet Galerkin Method Based on Daubechies' Compactly Supported Scaling Functions With Three and Four Vanishing Moments"; IEEE Microwave and Guided Wave Letters (2000); vol. 10, No. 4, pp. 125-127.

* cited by examiner

METHOD TO EXTRACT TARGET SIGNALS OF A KNOWN TYPE FROM RAW DATA CONTAINING AN UNKNOWN NUMBER OF TARGET SIGNALS, INTERFERENCE, AND NOISE

FIELD OF THE TECHNIQUE

The technique generally relates to data processing and more particularly, to the improvement of in-line oil debris sensor capability.

BACKGROUND OF THE TECHNIQUE

Early detection of mechanical damage by continuously monitoring the metallic debris in lubrication oil of various mechanical systems such as aircraft engines, is extremely important for fault diagnosis, maintenance decision-making, and accident prevention. In-line oil debris detection sensors have attracted attention recently because of the advantage of monitoring machine conditions continuously and eliminating some of the laboratory work required in off-line oil sample analysis. However, most oil debris sensors are not only sensitive to metal particles but also susceptible to various noises and vibrations. Therefore, there are two major issues to be addressed in real time oil debris detection. The first issue is how to use an existing sensor to detect the weakest possible debris or particle signals that are concealed in noise, such that quick responses to incipient failures can be achieved. The second is how to eliminate spurious signals caused by vibrations in the sensor working environment such that reliable maintenance decisions can be made.

The size of a particle that can be detected is mainly limited by background noise, while the challenge of eliminating spurious signals lies in their similarity to particle signals. This calls for an effective de-noising approach to address the two issues simultaneously.

Many de-noising techniques have been reported in the literature. Though de-noising has been studied by many researchers in various fields, work on purification of oil debris signal from the collected noisy data with the effects of vibration has not yet been reported in the accessible literature.

A collected oil debris signal is a mixture of several components including intrinsic noise, interfering vibration signals, and possible target oil-debris signals. However, most of the existing de-noising methods focus on the reduction of background Gaussian noise only, and thus cannot be directly applied to purify the collected oil debris signals.

Therefore there is a need for an improved data processing technique, particularly for enhancing in-line oil debris sensor capability.

SUMMARY OF THE DISCLOSURE

In one aspect of the technique, there is provided a method for extracting intermittent, randomly occurring transient target signals of known type from a raw data source signal containing an unknown number of the target signals in addition to interfering signals and/or intrinsic noise signals which comprises (a) defining quantifiable signatures or characteristics that respectively and independently represent the target signals, the interfering signals or the intrinsic noise signals; (b) transforming the raw data source signal with a mathematical transform that effects a decomposition of the source signal into distinct data sets; (c) processing said data sets to identify a first group of data sets which display the signatures or characteristics representing the interfering signals or intrinsic noise signals and a second group of data sets which display the signatures or characteristics representing the target signals, (d) setting the data sets of the first group to zero; and (e) applying an inverse transform to the processed data sets in order to reconstruct a processed output signal.

In another aspect of the technique, there is provided a method of enhancing the capability of a sensor for sensing a particle or bubble in a fluid flow, the sensor being adapted for generating transient target signals when particles or bubbles in the fluid pass through the sensor, which comprises the steps of (a) defining quantifiable signatures of the target signals, having a known frequency range of the target signals and a known kurtosis value range of wavelet coefficients of respective wavelet scales of interest that reflect a transient nature of the target signals; (b) defining quantifiable signatures of interfering signals and intrinsic noise signals, having two known kurtosis value ranges of wavelet coefficients of each of wavelet scales that correspond to the interfering signals and correspond to the intrinsic noise signals respectively; (c) obtaining a raw data sample signal in a time domain from the sensor in use for monitoring the fluid flow; (d) applying a Time-Invariant Wavelet Transform (TIWT) to said raw data sample signal to effect a decomposition of said raw data sample signal into a plurality of data sets in a form of wavelet coefficients of respective wavelet scales; (e) processing the data sets to calculate a kurtosis value for each data set to compare the kurtosis value for each data set with the kurtosis value range defined in step (a) or the kurtosis value ranges defined in step (b), in order to identify a first group of data sets which display the signatures representing the interfering signals and the intrinsic noise signals and a second group of data sets which display the signatures representing the target signals, and then setting the data sets of the first group to zero; (f) applying a thresholding rule to process the data sets of the second group in order to reduce any intrinsic noise signals which remain in the data sets of the second group; and (g) constructing a processed output signal by applying an inverse transform to the data sets processed in step (e) and (f).

Other features and advantages of the technique will be better understood with reference to the preferred embodiments described hereinafter.

BRIEF DESCRIPTION OF THE DRAWINGS

Reference will now be made to the accompanying drawings showing by way of illustration the preferred embodiments of the technique, in which.

DETAILED DESCRIPTION OF THE PREFERRED EMBODIMENTS

The definition of the following terms are applicable throughout the specification and the claims of this application.

A target signal is a signal which is sought. According to the described technique, target signals must be of finite duration, and must possess a known characteristic profile. Target signals may however occur at random intervals. In the case of an oil-debris sensor, a target signal is a transient signal created by the oil-debris sensor in response to the passage of a suspended particle passing through the sensor.

An intrinsic noise signal refers to a minimum, unavoidable noise of a sensor and measurement system. The intrinsic noise signal is the signal obtained from the sensor in controlled conditions. These conditions are contrived so as to possess no target signals and no significant interfering signals. In the case of an oil-debris sensor, the intrinsic noise signal is obtained from the sensor when operating in quiet laboratory conditions, without the passage of carrier medium (i.e. no metal particles) through the sensor.

An interference signal is any signal other than the target signal and intrinsic noise signal as defined above. In the case of an oil-debris sensor, interference signals may be caused by vibration of the structure where the sensor is mounted. Such interference is called vibration interference hereafter.

A raw data signal is the data collected in full operating conditions of a sensor system. Raw data signals may include intrinsic noise, possible interference signals, and possible target signals. In the case of an oil-debris sensor, raw data is collected over a time window when the carrier medium (e.g., fluid) that may possess suspended particles, passes through the sensor and when the sensor is subjected to interfering signals arising from vibration.

Figure 1:
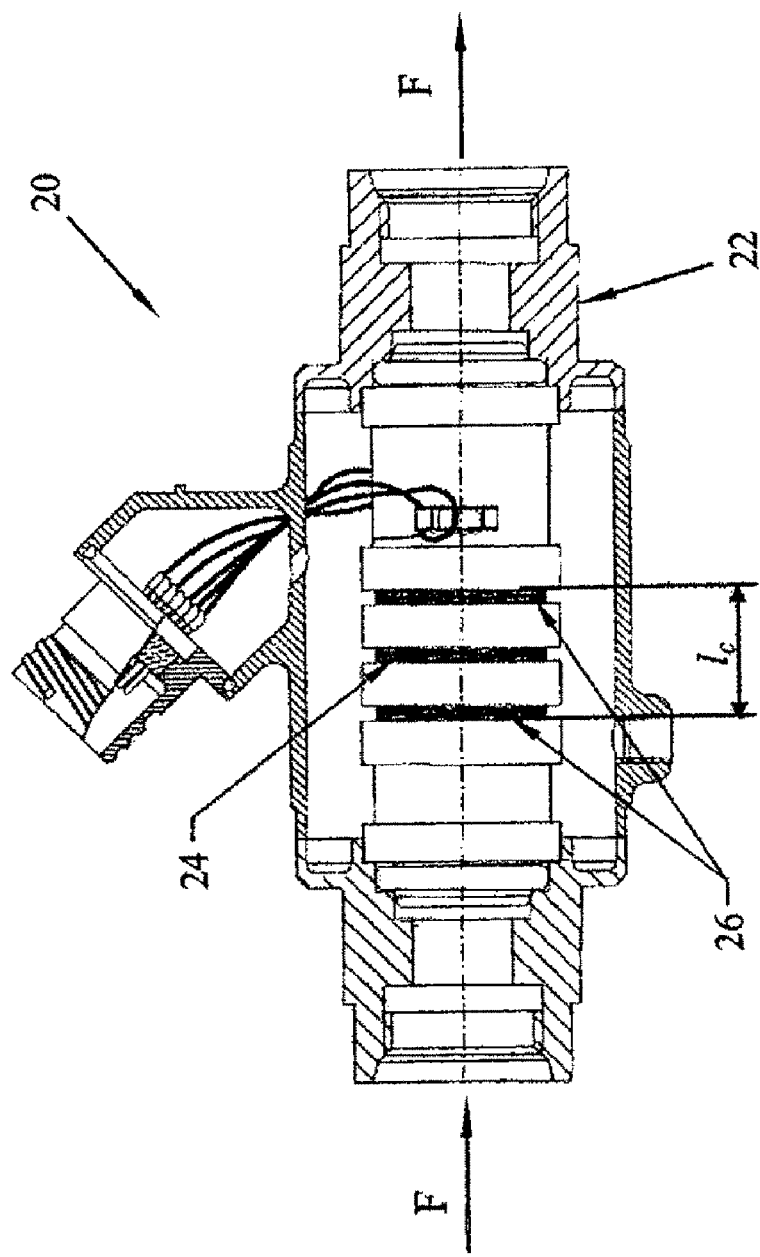
FIG. 1 is a cross-sectional view of an oil debris sensor according to one embodiment employing the technology.

As illustrated in FIG. 1, an oil debris sensor 20, as an example of sensors used in detecting particles in a fluid flow, generally includes a tubular body 22 connected in a pipeline (not shown), such as a lubricant oil line, to allow the oil flow to pass through the tubular body 22 as shown by arrows F. A coil assembly including one sensing coil 24 and two field coils 26, is mounted around the tubular body 22. The sensing coil 24 is located equidistant between the upstream and downstream field coils 26. When ferromagnetic particles or non-ferromagnetic particles including bubbles in the oil flow, pass the sensor 20, the sensing coil 24 generates a target signal of known characteristics. In real operating conditions, this target signal is usually mixed with interfering and/or noise signals and can be definitively identified only after the raw data output signal from the sensing coil 24 is properly processed. The sensor 20 is known and similar to that described in U.S. Pat. No. 5,315,243 granted to Kempster et al. on May 4, 1994, which is incorporated herein by reference.

Figure 2:
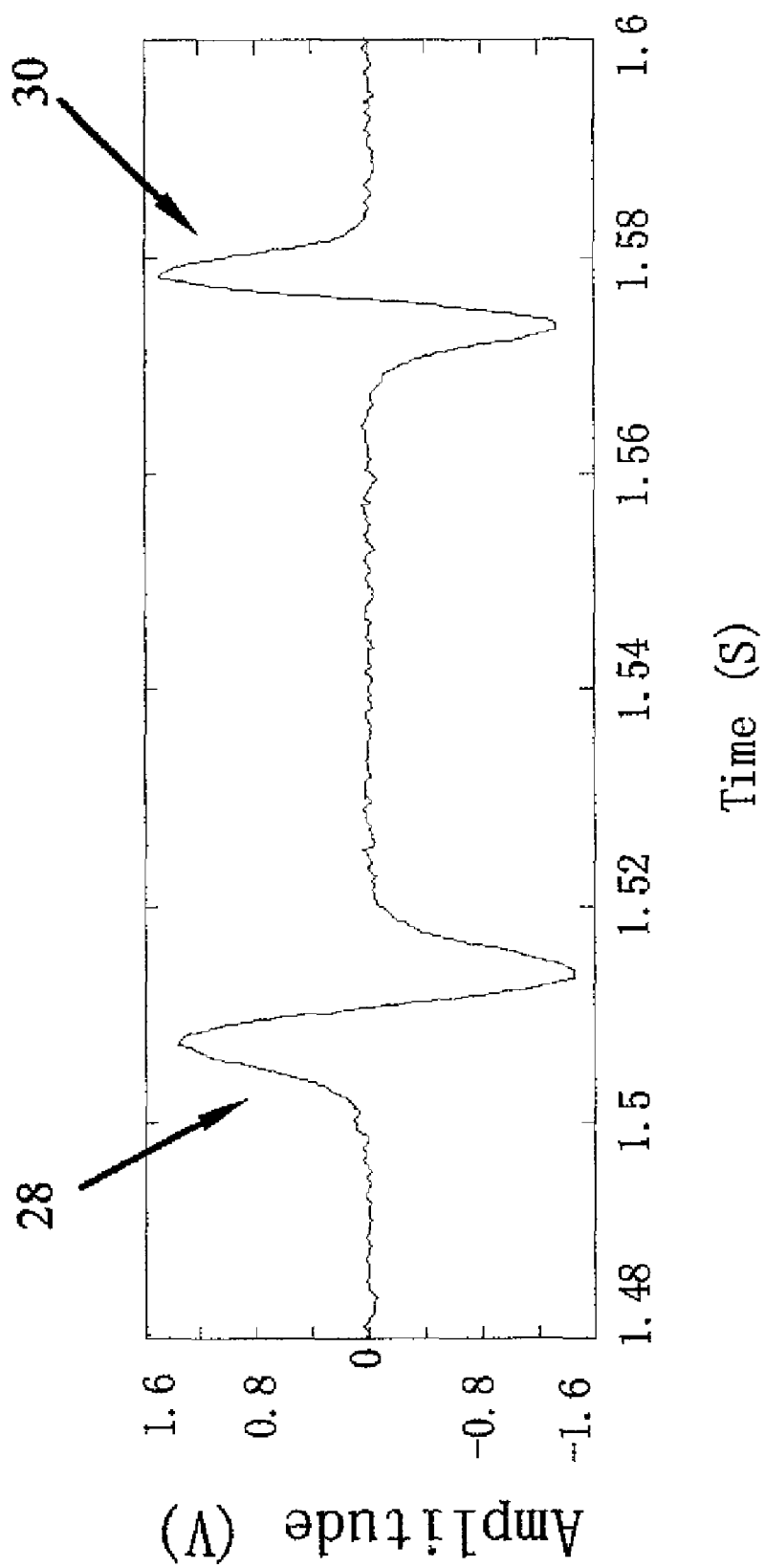
FIG. 2 illustrates shapes of ferrous and non-ferrous particle signatures generated by the sensor shown in FIG. 1.

FIG. 2 illustrates ferrous and non-ferrous target particle signals 28 and 30 of characteristics of the intermittent, randomly occurring and non-periodical transient signal components generated by the sensor 20 in FIG. 1, representing a detected ferrous particle and non-ferrous particle passing through the sensor 20. The ferrous particle signature 28 and non-ferrous particle signals 30 are similar but are 180° out of phase relative to each other. The shapes of the target signals 28 and 30 may be similar to one full period of a sine wave, depending on conditions under which the sensor 20 operates.

In a practical working environment, the particle target signals 28, 30 in a sample signal obtained from the sensor 20, are mixed with other unwanted signal components caused by background noise, vibration interference, etc. The responsiveness level of the sensor 20 depends on the size of the particles to be detected in the oil flow. The detectable particle size is mainly limited by background noise. Spurious signatures such as vibration-like signals may cause false alarms. The challenge of improving the responsiveness and reducing false alarms lies in the very weak particle signals and their similarity to spurious signals.

Therefore, a method of enhancing the capabilities of a sensor for sensing particles or bubbles in a fluid flow such as an oil flow is developed, generally based on the definition of a target signatures or characteristics of the known target signals generated by sensor 20. The target characteristic or signature is defined to enable the data analysis, as described below.

To provide better de-noising results, target signal signatures or characteristics can be defined using general information relating to the target signal. For example, the target particle signal frequency range may be estimated and this frequency can be used as a target signal signature. At the early stage of a fault developed in a machine, the metal debris is very small and it can be assumed that the particle and oil speeds are identical. Hence the particle signal frequency can be estimated based on oil speed. The flow speed of lubricating oil is assumed to be in range $[v_{min}, v_{max}]$. $v_{min}$ and $v_{max}$ represent the minimum speed and the maximum speed, respectively. As shown in FIG. 1, the distance $l_c$ between the ends of the two field coils 26 in the sensor 20, can be measured and therefore, the time required for a particle to pass through the two field coils 26 can be calculated. A corresponding frequency component can be obtained as a reciprocal of said time period. Therefore, a target particle signal characteristic is a frequency in range $[v_{min}/l_c, v_{max}/l_c]$. Obviously, any signal with a frequency outside the ranges should be treated as interfering signals and should be filtered out. However, in practice, not all interfering signals and noises can be removed in this way. Filtered signals may still contain noise and vibration-like signals in the particle frequency range. Therefore, the invention provides for a more complete digital filtering process using the above target signal signature.

In a machine monitoring process, for example, the sensor 20 of FIG. 1 is connected to an oil circuit of the machine for detecting particles in the oil flow passing through the oil circuit. A raw data sample signal in a time domain, as the raw data source signal, can thereby be obtained from the sensor 20. The raw data sample signal obtained from the sensor 20 is then processed in a digital filtering process using defined signatures or characteristics of the target signal and of the noise and/or interfering signals. These are used to separate any target signals from the other raw data signal components.

According to the invention, this process is conducted by processing the data, using a mathematical transform that deconstructs the raw data source signal into distinct, transformed data sets. Each data set is analyzed for signatures of the target signal and of the background noise and interferences. Depending on the specific noise, data sets displaying unwanted signal components are either nullified (set to zero) as in the case of data sets containing interference type signatures or, in the case of data sets containing signatures of the target signal, the intrinsic noise can be removed from the data sets which can then be said to be 'de-noised' or purified. The processed data sets are then reconstructed to create a processed purified signal.

In a preferred embodiment, several signal signatures are used, including the frequency range of the target particle signal as described above, and a statistical-type signature that distinguishes target particle signal from vibration interference as described later.

The digitally processed sample signal is re-constructed in the time domain. The re-constructed, processed sample signal contains the target signal component in greater proportion with respect to the unwanted noise and vibration-like components, compared to that found in the original, pre-processed raw data sample signal. The capability and responsiveness of sensors such as sensor 20 is therefore enhanced.

According to one embodiment, the mathematical transform utilized is the joint Time-Invariant Wavelet Transform (referred to as a TIWT hereinafter). In this case, each data set that results from the transform is called wavelet coefficients of a scale.

The specific mother wavelets used in the TIWT are pre-selected so as to possess similar morphology (signature) to the particle target signal.

According to one embodiment, signal signatures are determined by a statistical approach such as a kurtosis analysis. The statistical analysis is used to differentiate the target signals from the interference and noise components. Kurtosis analysis is used to: a) remove background noise by setting the wavelet coefficients that are in the scales with kurtosis value between $[3-\Delta_2, 3+\Delta_2]$ to zero; b) identify and remove vibration-like signal components by setting the wavelet coefficients that are in the scales with kurtosis value between $[1.5-\Delta_1, 1.5+\Delta_1]$ to zero; and c) identify and extract the non-periodic, intermittent, randomly occurring and transient signal component of known form by retaining wavelet coefficients, and hence the associated signal components, in the scales having sufficiently high kurtosis value.

Wavelet transform is used to: a) decompose the raw signal into frequency bands so that some signal components are de-coupled and each can be more easily handled; b) remove any signal component with frequency that is out of range $[v_{min}/l_c, v_{max}/l_c]$ by setting the associated wavelet coefficients to zero (where $v_{min}$ and $v_{max}$ are the minimum and maximum particle passage speeds respectively); and c) remove the Gaussian noise from the high-kurtosis scales (where the kurtosis is high and so these scales contain the particle signal, thus the kurtosis cannot be used for removing noise from these scales and instead a thresholding rule is used).

In summary, both wavelet transform and kurtosis analysis contribute to both noise reduction and spurious signal removal. Such tasks cannot be properly done by separately applying wavelet transform and kurtosis analysis. To be effective, the kurtosis analysis has to be embedded and applied to each wavelet transform scale of interest.

In contrast to many existing de-noising algorithms where discrete wavelet transform (referred to as DWT hereinafter) is employed, TIWT is adopted in this technique because compared with DWT, TIWT has the advantage of translation invariance. In most de-noising methods based on DWT, the size of a signal shrinks in the process of wavelet decomposition, with different shrinkage rates in different frequency bands (or scales). This leads to two problems: reduced time resolution and deteriorated statistical accuracy when a statistical method is jointly applied. With the TIWT, a signal is never down-sampled and the filters are different on each decomposition level. The signal can be decomposed into different scales (frequency bands) without any size shrinkage in any scales (frequency bands). Therefore, adopting TIWT can effectively avoid the two problems. As a result, the same good time resolution can be preserved in all scales (frequency bands) and a statistical method can be applied.

Based on the experimental observation of oil debris and spurious, particularly vibration-like signals, it may be suggested that kurtosis, a statistical indicator, be used to distinguish the two. Machine vibration can be characterized by a series of consecutive waves with specific frequency components while the signals generated by particles appear intermittently but not periodically, it is therefore possible to distinguish vibration signal and particle signal through the analysis of signal statistical characteristics. Kurtosis as a statistical indicator is sensitive to the shape of a signal. Therefore, it will be adopted for in-line oil debris detection. A joint TIWT and kurtosis analysis method may be used to de-noise the collected sample signal data and eliminate spurious signals.

Wavelet transform, if properly applied, is able to reveal useful information of a signal in a time-frequency domain. A wavelet $\psi(t)$ is a function of zero average with limited duration on $(-\infty, \infty)$. The continuous wavelet transform (CWT) of a finite energy signal x(t) can be defined by $$W_{a,b} = |a|^{-1/2} \int x(t)\overline{\psi}\left(\frac{t-b}{a}\right) dt \qquad (1)$$

where a and b are the dilation and time parameters of the wavelet respectively $\{a>0, b \in R\}$, $W_{a,b}$ denotes wavelet transform coefficients, $\psi_{a,b}$ represents a wavelet formed from a mother wavelet function $\psi(t)$ through rescaling and shifting, $\overline{\psi}$ stands for complex conjugate. A different scale a corresponds to a specific frequency component range.

Scale-time parameters (a,b) can be discretized by $a=2^j$ and $b=k2^j$ for fast computing in practical implementation. Accordingly, the discrete wavelet transform (DWT) is given by $$W_{j,k} = 2^{-j/2} \int x(t)\overline{\psi}(2^{-j}t-k) dt \qquad (2)$$

where j and k are arbitrary integers.

A fast discrete wavelet transform called multi-resolution pyramidal algorithm is known in the art. With this algorithm, the original signal x(t) passes through two complementary filters and emerges as a signal in a low frequency band and a signal in a high frequency band, respectively. Hence, the original signal can be decomposed into different frequency bands through an iteration process. The pyramidal algorithm is implemented using $$<x(t), \phi_{j,k}> = \sum_k <x(t), \phi_{j-1,k}> g(k-2n) \qquad (3)$$

$$<x(t), \psi_{j,k}> = \sum_k <x(t), \phi_{j-1,k}> h(k-2n) \qquad (4)$$

where $\phi_{j,k}$ is a scaling function, g(k) and h(k) are respectively the impulse responses of low and high pass filters, and $<\cdot,\cdot>$ denotes the inner product operation. For a signal x(n), $c_{0,n}=x$ (n) and n is an arbitrary integer. According to equations (3) and (4), the DWT of signal x(n) can be written as $$c_{j,n} = \sum_k c_{j-1,k} g(k-2n) \quad (5)$$

$$w_{j,n} = \sum_k c_{j-1,k} h(k-2n) \quad (6)$$

where $c_{j,n}$ and $w_{j,n}$ are discrete scaling coefficients and wavelet coefficients, respectively. They represent the approximations and details of x(n) at resolution $2^j$, respectively.

Figure 3:
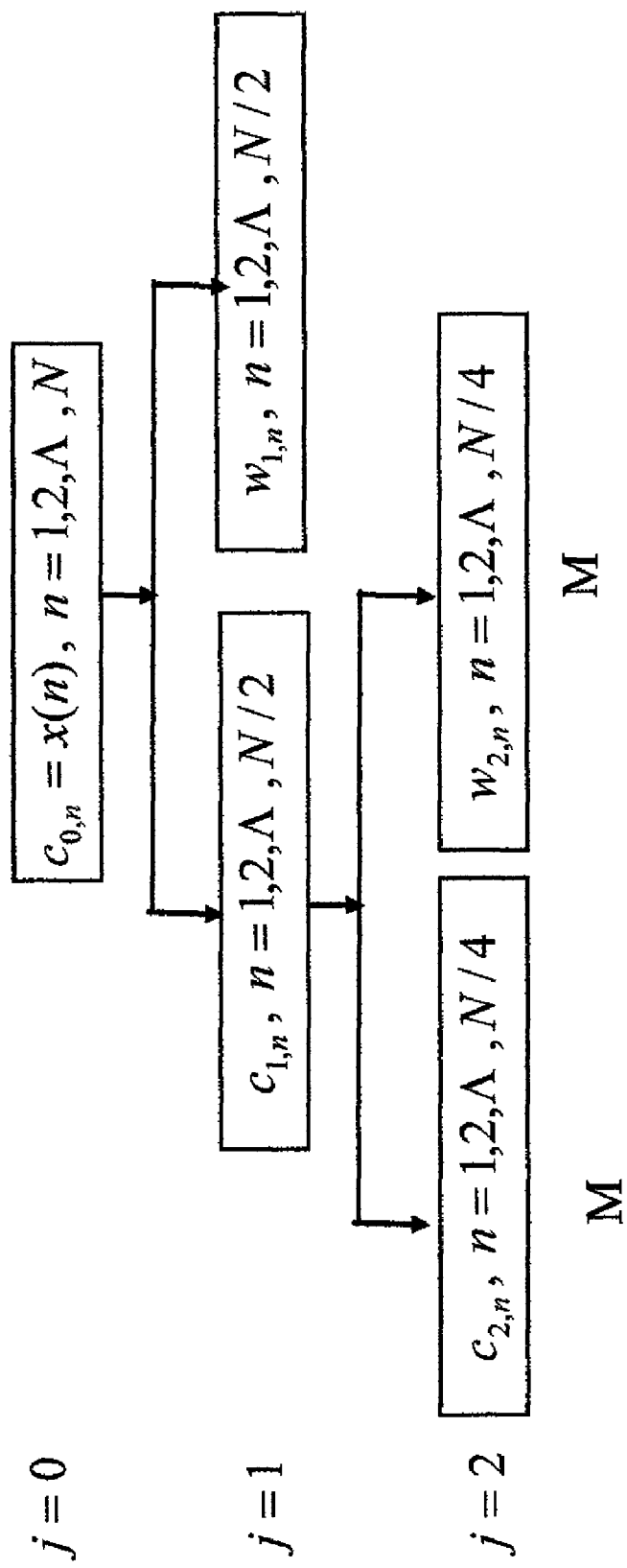
FIG. 3 is a block diagram showing the length of each approximation and detail of signal x(n) after a Discrete Wavelet Transform (DWT) process.

In equations (5) and (6), a down-sampling algorithm which keeps one point out of two, is used to perform the transform. The length of signal x(n) will reduce by half after each transform. If original signal x(n) has N samples, discrete coefficients $c_{j,n}$ and $w_{j,n}$ have $N/2^j$ samples, respectively, j=1, 2, ..., J. J is the maximum number of discrete wavelet transform iterations as illustrated in FIG. 3. Therefore, the length of each approximation and detail of x(n) becomes shorter after each transform iteration. With the decrease in sample length, the statistical characteristics of the approximation and detail located in specific frequency bands may no longer be accurate.

To alleviate the above difficulty, TIWT is proposed by introducing an up-sampling algorithm into the DWT in an attempt to keep the time-invariance property of signals, which is preferred in statistical signal processing implementation. For function $f(n)$, the up-sampling algorithm can be defined as $f(2n)=f(n)$ and $f(2n+1)=0$. The basic idea of TIWT is to modify the quadrature mirror filters through an up-sampling algorithm by $$\begin{cases} g(2n) = g(n) \\ g(2n-1) = 0 \end{cases} \quad (9)$$

$$\begin{cases} h(2n) = h(n) \\ h(2n-1) = 0 \end{cases} \quad (10)$$

before performing a convolution between the filters and the original signal or previous discrete scaling coefficients obtained by wavelet transform, in order to keep the redundancy of wavelet transforms. The key is to modify filters by inserting zeros in them. Consequently, equations (5) and (6) can be revised as $$c_{j,n} = \sum_l c_{j-1,n+2^{j-1}l} g(l) \quad (11)$$

$$w_{j,n} = \sum_l c_{j-1,n+2^{j-1}l} h(l) \quad (12)$$

respectively, where l is an arbitrary integer. Therefore, the nature of time-invariant wavelet transform of the original signal is maintained. All the TIWT coefficients at the $J^{th}$ decomposition level can be written as $\{W_{j,n}|j=1, 2, \ldots, J+1\}$ consisting of $c_{j,n}$, $w_{j,n}$, $w_{J-1,n}$, ..., and $w_{1,n}$.

Figure 4:
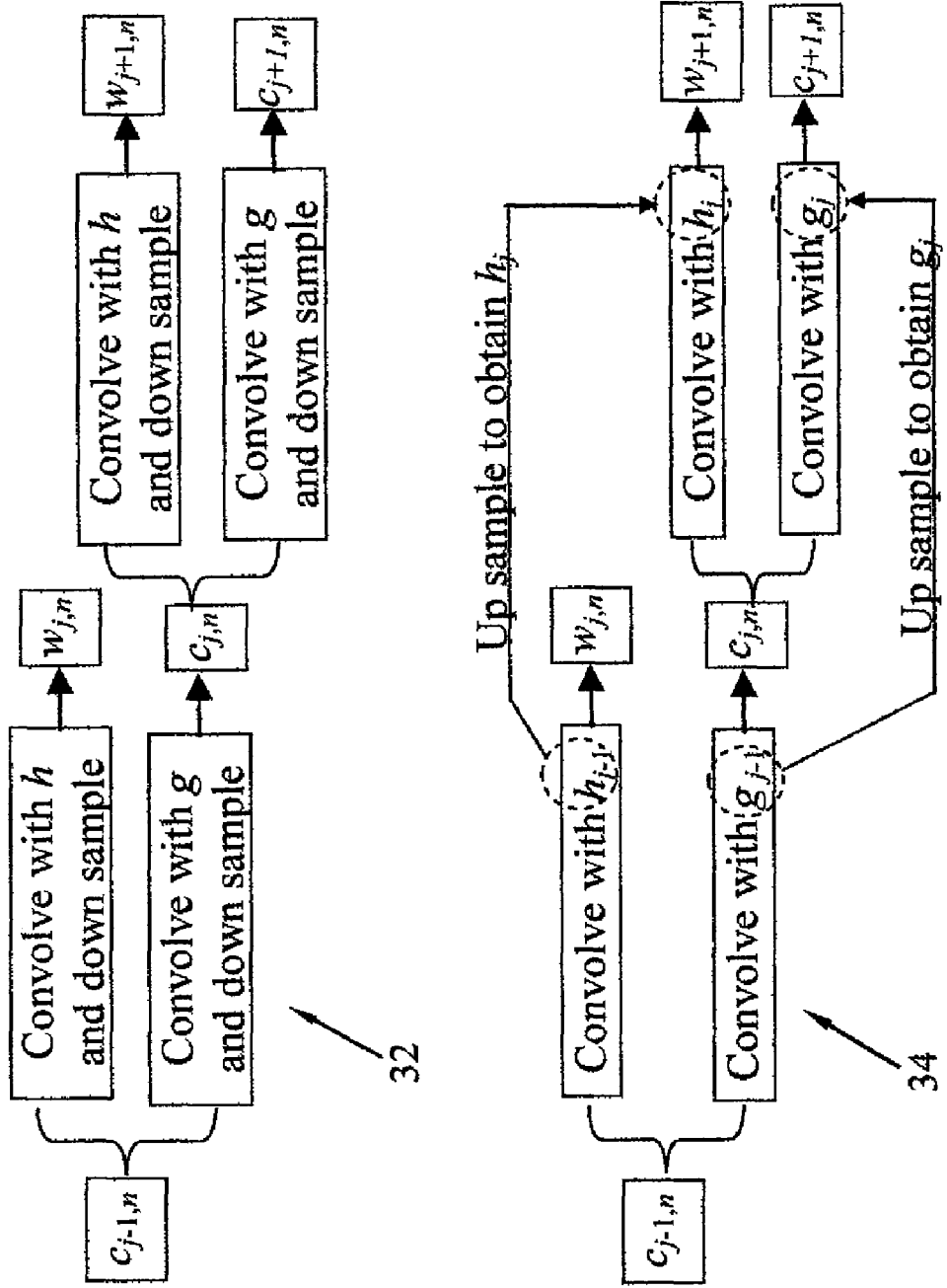
FIG. 4 is a block diagram showing a comparison of the algorithms of DWT and Time-Invariant Wavelet Transform (TIWT)

The algorithms of DWT as indicated by numeral 32 and TIWT as indicated by numeral 34, are illustrated in FIG. 4, wherein $g_j$ and $h_j$ represent the filters used at resolution $2^j$. In the algorithm of TIWT 34, when high-pass and low-pass filters are applied to a signal, the two new sequences will have the same size as the original one. This effectively preserves the time-invariance property of wavelet coefficients, thereby maintaining the time resolution of the original signal and the statistical properties of the wavelet coefficients. Based on the above analysis, the main differences between algorithms DWT 32 and TIWT 34 can be summarized in Table I.

TABLE I

THE DIFFERENCES BETWEEN THE DWT AND THE TIWT

|  | DWT | TIWT |
|---|---|---|
| Size of filters g and h | No changes before each DWT | Doubled before each DWT |
| Size of wavelet transform of signals | Half of the prior signal size | Same as the original signal size |
| Translation invariance | No | Yes |
| Time resolution | Low | High |
| Statistical properties | Low accuracy | High accuracy |
| Required size of original signal | The size should be large enough to capture signatures | The size should be large enough to capture signatures and the size should be divisible by 2 |
| Frequency resolution | Same | |

As mentioned above, the oil debris sensors are not only sensitive to metal particles but also susceptible to noise signals, interferences such as vibration signals. Some of these effects may generate signals similar to the particle signals. The similarity between the two types of signals makes their separation a very challenging issue and improper removal of noise or vibration signals can spoil the outcome in later steps. Therefore, the removal of vibration signal should be handled very carefully. In practice, a mechanical vibration signal is periodic, similar to a sinusoidal wave or a combination of several sinusoidal waves with relatively stable frequencies. On the other hand, particle target signals are of finite duration and they occur randomly and intermittently i.e. neither the target signals nor their rate of occurrence is periodic. Therefore, the collective pattern of a vibration signal is different from that of a particle, though their individual waveforms may look very much alike. It should also be noted that the signal of an individual particle is similar to one full period sine wave in the time domain. As kurtosis is well suited to the detection of such transient signals, it should also be effective in detecting particle signals.

Given a time series $x=(x_1, x_2, \ldots, x_N)$, the kurtosis value can be easily computed on line by $$\text{kurtosis} = \frac{\sum_i (x_i - \bar{x})^4 / N}{(\sum_i (x_i - \bar{x})^2 / N)^2} \quad (13)$$

where i=1, 2, ..., N, and $\bar{x}$ is the mean value of x, N is the size of x.

More specifically, the kurtosis of a signal consisting of successive but non-periodic individual wave segments is different from that of a periodic signal of the same wave form. This can be demonstrated by simulated signals. Consider the following four signals as indicated by numerals 36, 38, 40 and 42 in FIG. 5:

$$x1(t) = \sin(2\pi 100t),$$
$$x2(t) = \sin(2\pi 15t),$$
$$x(t) = x1(t) + x2(t),$$
and
$$x3(t) = \begin{cases} \sin(2\pi 5t) & 0.432 < t < 0.5 \\ 0 & \text{else} \end{cases}$$

Figure 5:
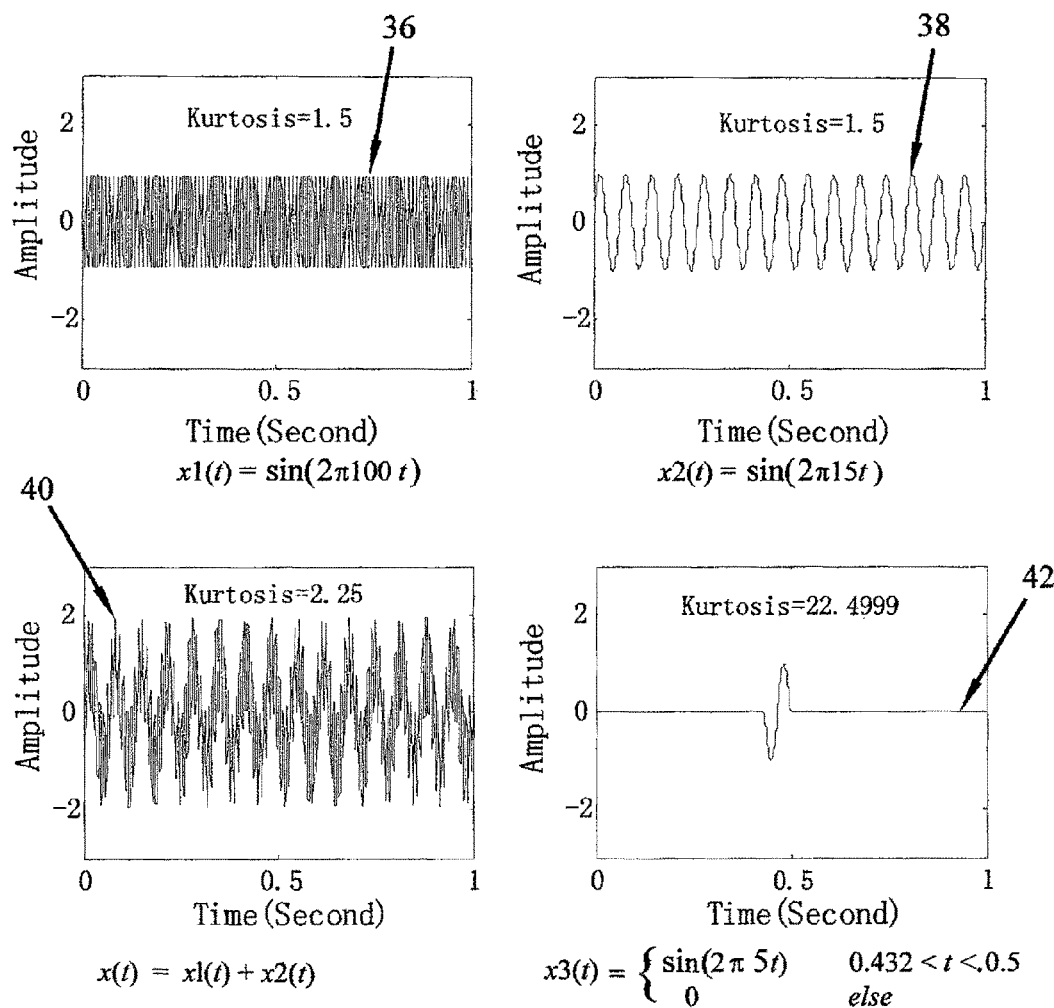
FIG. 5 is a graphical illustration of signals for example with different sinusoidal compositions having different kurtosis values.

The signals between 0 and 1 second time duration and their kurtosis are shown in FIG. 5. It can be seen that 1) the kurtosis is 1.5 for sinusoidal signals 36 and 38 regardless of their frequencies; 2) the kurtosis of signal 40 formed by a combination of multiple sinusoidal functions is 2.25, higher than that of a single sinusoid function such as signals 36, 38; and 3) a signal 42 containing only one segment of a sine wave leads to a much higher kurtosis value, 22.4999.

The above observation gives rise to the use of kurtosis value as a classification criterion for separating vibration and particle signals. However, the collected vibration interference signal may be a mixture of several periodic signals of different frequencies such as signal 40. The kurtosis value of such a data mixture is dependent on the mixture contents and hence cannot be directly used for signal classification. For this reason, the collected data mixture has to be decomposed into several frequency bands. A frequency band may be associated with a unique signal, with or without periodicity. Kurtosis for each frequency band should be calculated separately to make meaningful classification decisions.

As illustrated in FIG. 5, the kurtosis of a sinusoidal signal is 1.5 which can be used as a criterion to remove such signals from the collected data. Given signal x(t), all TIWT coefficients at the $J^{th}$ decomposition level, $\{W_{j,n}|j=1, 2, \ldots, J+1\}$ can be obtained. For each j corresponding to a specific frequency band, the associated kurtosis value can be calculated. However, considering the fact that the actual vibration signals are unlikely to be truly sinusoidal, a tolerance range is used and the criterion is relaxed to $1.5 \pm \Delta_1$ ($\Delta_1=1$ in this embodiment).

In addition to its aforementioned ability to separate periodic and non-periodic individual wave segments signals, kurtosis is also a good indicator of background noise. The background noise is generally Gaussian noise with a zero mean, the kurtosis of which is three. However, the noise may not be truly Gaussian noise, therefore the criterion is relaxed to $3 \pm \Delta_2$ ($\Delta_2$ is set to 0.5 in this embodiment). This kurtosis range will be used as a criterion to remove background noise. Then wavelet coefficients in different scales are either set to zero or kept based on their relevance to the transient particle signal. Such decision may be based on the following rules:

Rule 1: If the frequency range of a scale is not in the range of interest, i.e., $[v_{min}/1_c, v_{max}/1_c]$, set the wavelet coefficients in the frequency range to zero; and Rule 2: If the kurtosis of the wavelet coefficients of a scale is between $1.5 \pm \Delta_1$ or $3 \pm \Delta_2$, set the wavelet coefficients of this scale to zero.

The remaining coefficients on a certain scale should contain the information of particles. It should be noted that the remaining coefficients also contain the information of noise as well. For this reason, threshold $\sigma\sqrt{2\log(N)}$ is used to shrink the remaining wavelet transform coefficients wherein N is the number of samples and $\sigma$ is the standard deviation of the noise. Though the background noise can be reasonably assumed to be Gaussian noise with a zero mean, its strength, reflected by its standard deviation $\sigma$, is unknown. In the prior art, $\sigma$ is usually estimated by MAD/0.675. MAD is the Median Absolute Deviation value of the appropriately normalized fine-scale wavelet coefficients. To provide more accurate results, it may be suggested to calculate the true strength of noise, $\sigma_j$, corresponding to each scale j directly from the raw data collected without the presence of any particles or vibration signals. Since such raw data contains only background noise, the directly calculated $\sigma_j$ represents the true noise level. In practice, the raw data collected for calculation of $\sigma_j$ values may be obtained from a reference sample signal obtained from the same sensor 20 of FIG. 1 without fluid passing therethrough and in the absence of structural vibration. The intrinsic noise sample signal is decomposed into the same number of scales as the number of scales of the raw data source signal using TIWT.

Figure 6:
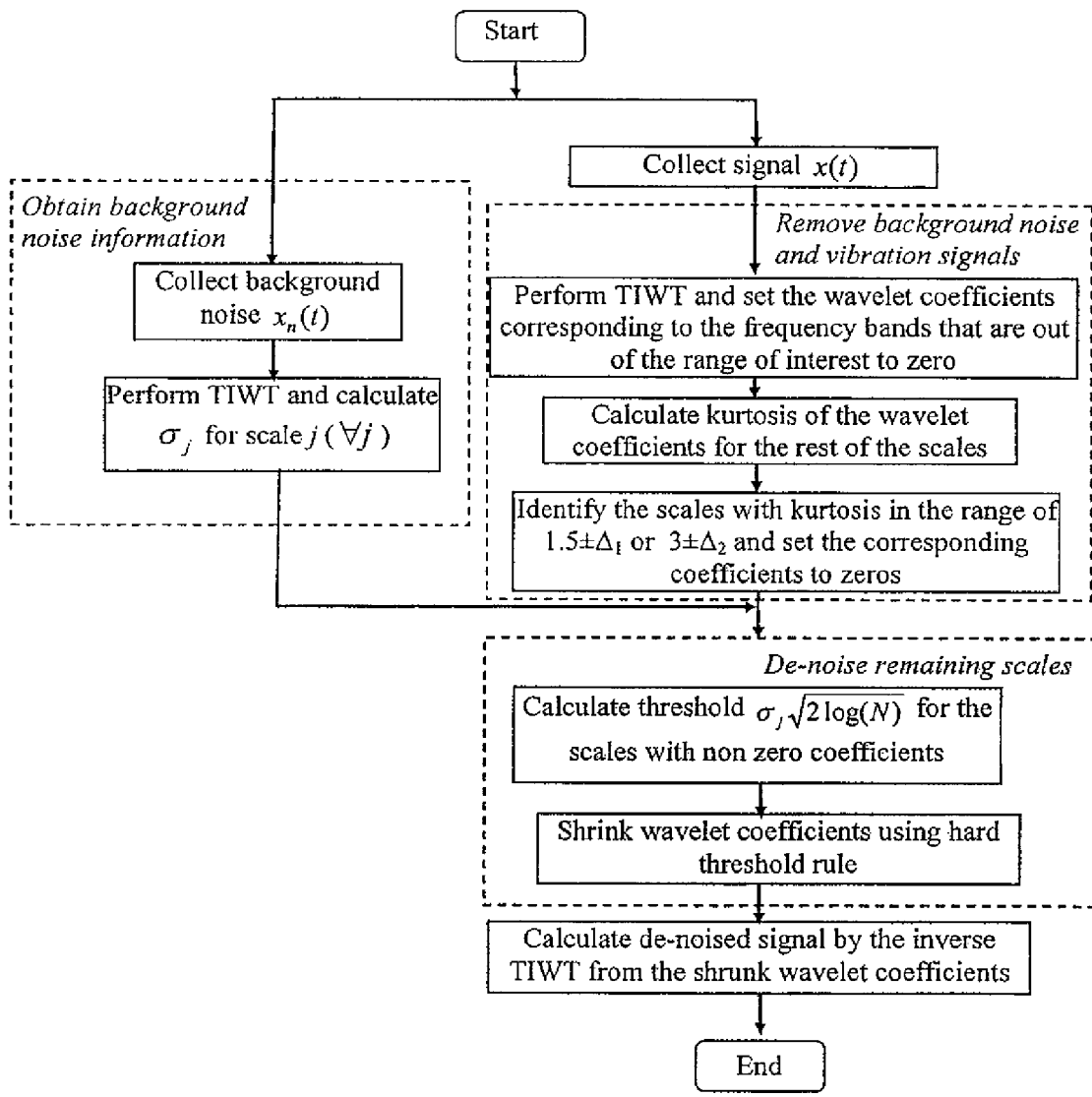
FIG. 6 is a block diagram showing one embodiment for de-noising a collected sample signal and recovering a desired signature.

The main steps of the proposed embodiment are illustrated in FIG. 6. First, as shown in the left two blocks, the background noise is collected and decomposed by TIWT. Then, the standard deviation $\sigma_j$ of the coefficients on each scale (j=1, 2, . . . , J) is calculated. The $\sigma_j$ values will be saved in the computer and used to calculate the thresholds for de-noising. Next, as represented on the right part of FIG. 6, the raw data that represents a mixture of particle signal, vibration signal, and background noise, is for example, the sample signal obtained from the sensor 20 of FIG. 1 during the monitoring operation of the sensor 20 connected in the oil circuit of a machine, and is decomposed by TIWT. The obtained coefficients will be processed based on rules 1 and 2 described above. Once the two rules are implemented, the undesirable frequency components are filtered out. The signal components in the remaining scales are then de-noised using the hard thresholding rule of $\sigma_j\sqrt{2\log(N)}$. Finally, the particle signal is reconstructed from the processed coefficients. The reconstructed signal can then be used for particle identification.

It should be noted that the kurtosis value ranges $1.5 \pm 1$ or $3 \pm 0.5$ used in the above embodiment are estimated based on experiments for description and demonstration of this embodiment. In practice, the kurtosis value ranges to be used in this process may be different.

It should also be noted that since a wavelet basis is not unique, selecting an appropriate wavelet for a specific problem is usually desirable. For example, Daubechies wavelets are orthogonal and compactly supported so as to provide an ideal mathematical tool for constructing conjugate quadrature filters in signal analysis, and are therefore selected for use in this embodiment in order to avoid information leakage in wavelet transform. It may also be preferable that the mother wavelets match the shape of the particle signatures, such as signatures 28 and 30 shown in FIG. 2. For this reason, db4 wavelet function is selected. In other applications, the wavelet basis to be used in this process may be different.

The number of decomposition levels which determines the number of scales, affects the analysis results. Increasing the number of decomposition levels will reduce the band width of the frequency component of each scale and hence the interfering signal components may be better distinguished from the transient particle signature. However, too many decomposition levels inevitably increase computing time which is undesirable for on line applications. To specify appropriate decomposition levels, it may be useful to know the transient particle signal frequency range. The frequency resolution of the highest scale may preferably be high enough to identify the lowest frequency of interest. In other words, the frequency band width of the highest scale may preferably be smaller than the lowest frequency of interest. Denoting $f_w$ as the frequency band width of the highest scale and L as the number of decomposition levels, $f_w$ should satisfy the following condition $$f_w = f_s/2^{L+1} < f_l \quad (12)$$

where $f_l = v_{min}/l_c$ is the lowest frequency of interest, and $f_s$ denotes the sampling frequency. Then, $$L > \frac{\ln f_s - \ln f_l}{\ln 2} - 1 \quad (13)$$

For example, if the sampling frequency is 8000 Hz, the decomposition level should satisfy $$L > \frac{\ln 8000 - \ln(v_{min}/l_c)}{\ln 2} - 1 \quad (14)$$

Figure 7:
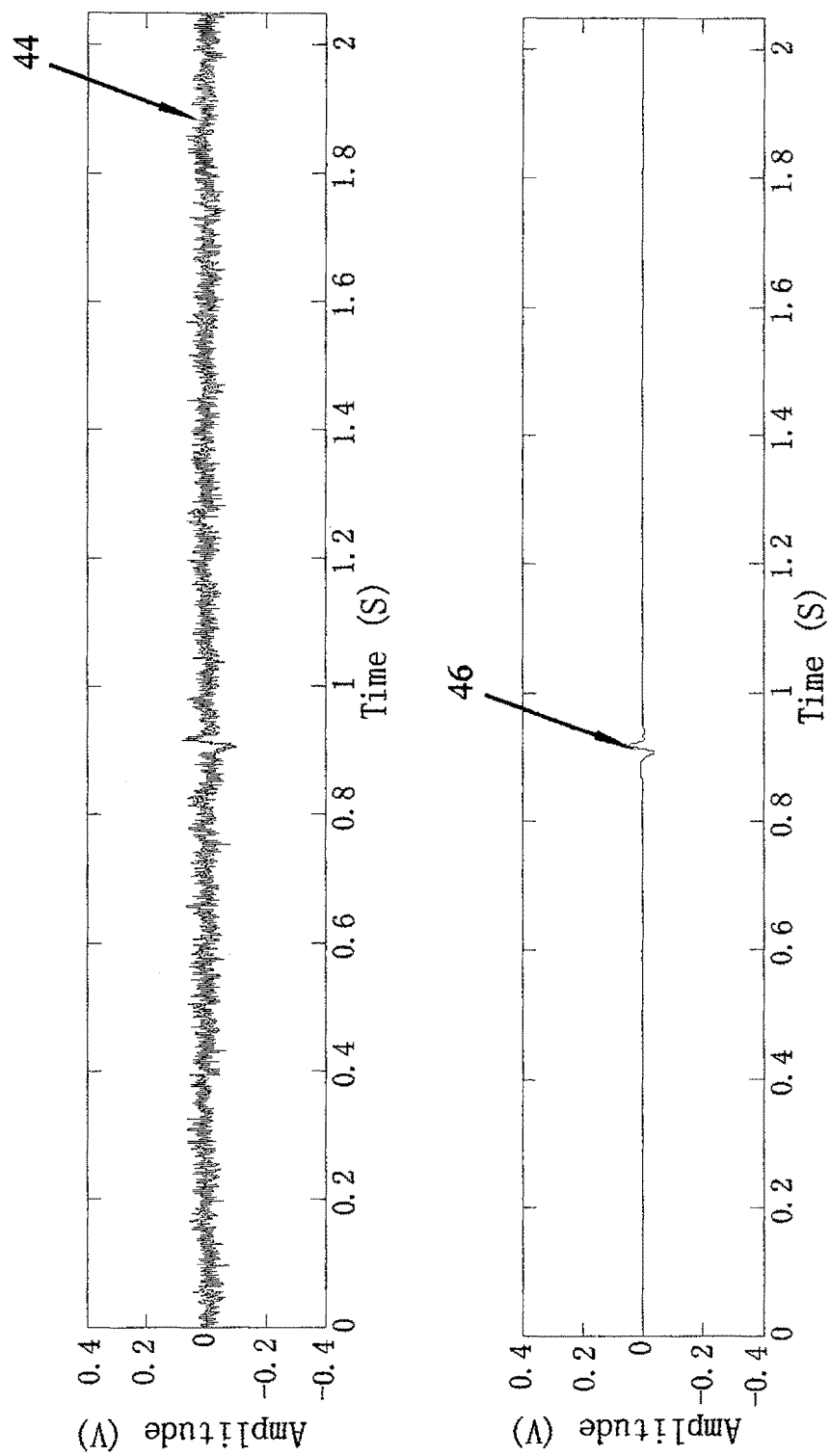
FIG. 7 is a graphical illustration of extraction of a non-ferrous particle signature from a collected sample signal without vibration components.

FIG. 7 illustrates a sample signal 44 including a particle target signal generated by a non-ferrous particle of size 211 µm mixed with a background noise signal and shows the de-noising result in accordance with the described method, in which the noise signal components are removed and the non-ferrous particle signal 46 is identified.

Figure 8:
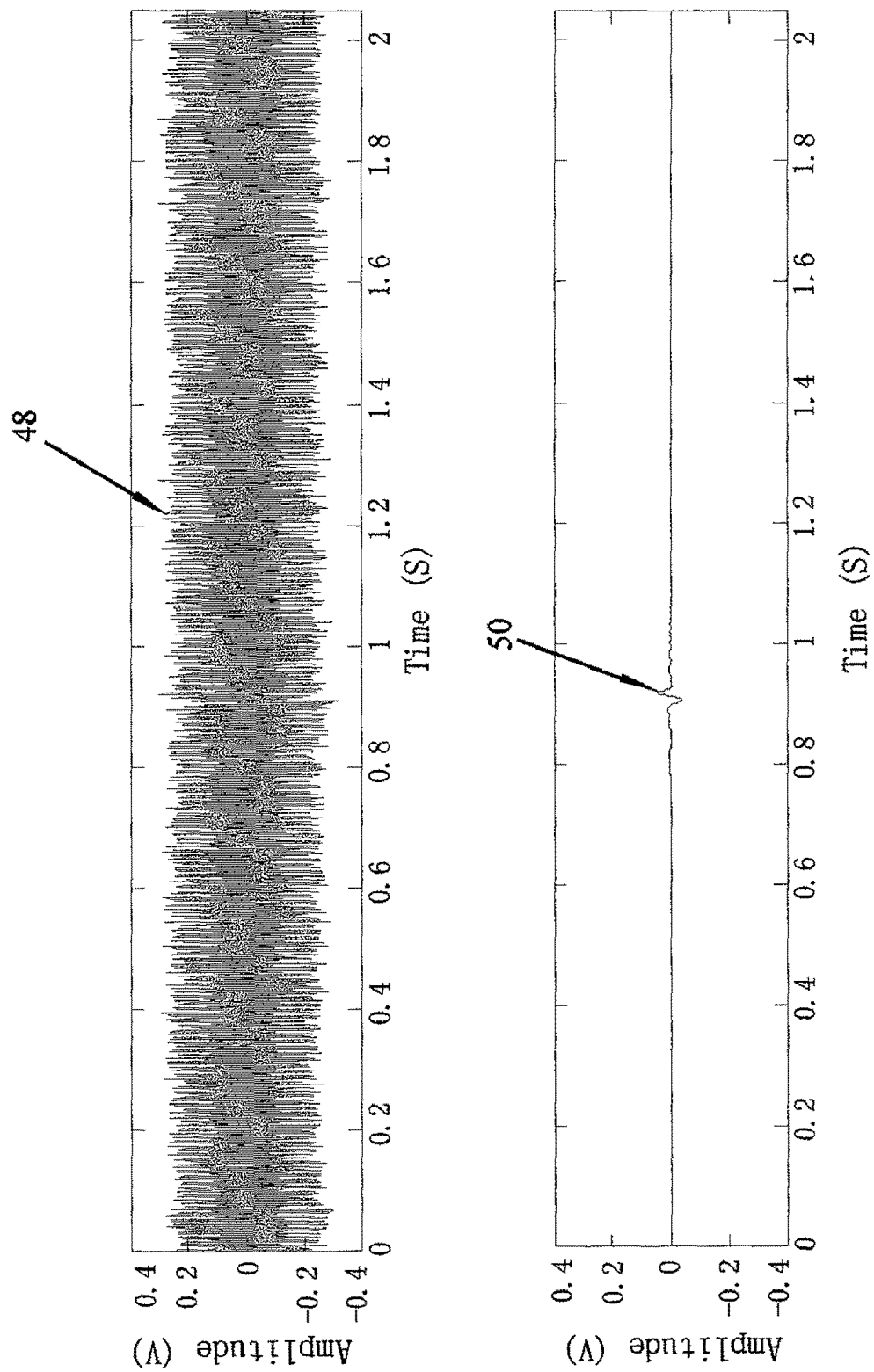
FIG. 8 is a graphical illustration of extraction of a non-ferrous particle signature from a mixture of the collected sample signal and simulated vibration signal components.
Figure 9:
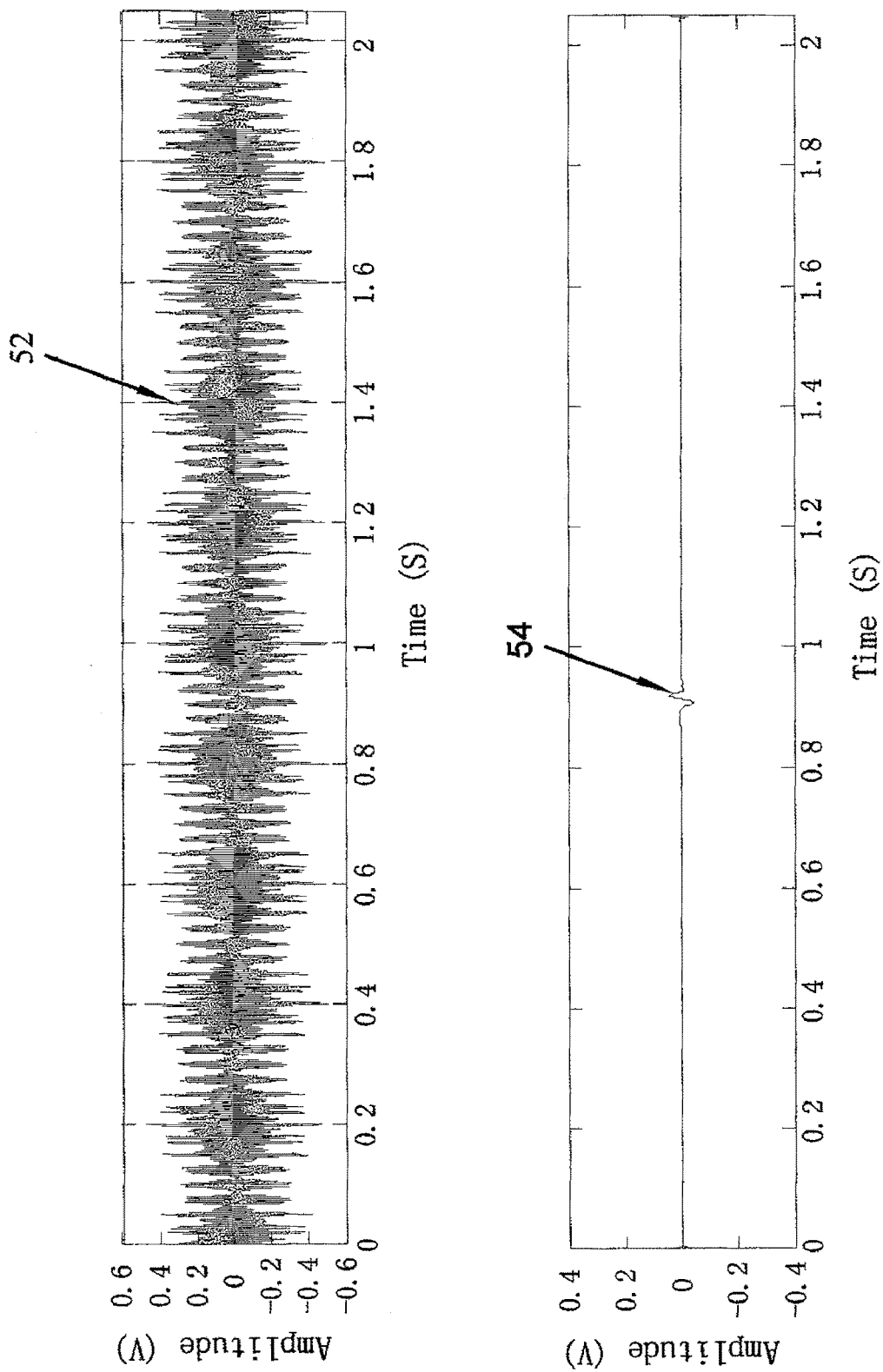
FIG. 9 is a graphical illustration of extraction of a non-ferrous particle signature from a mixture of a collected sample signal and a periodically modulated vibration.

FIGS. 8 and 9 illustrate sample signals 48 and 52 including particle target signals 50 and 54 generated by a non-ferrous particle of size 211 µm. As seen in the figures the target signals are essentially hidden in the noise and simulated vibration signals. Therefore the signatures 50 and 54 in signals 48 and 52 are not visually observable. It is impossible to successfully process the signals obtained from the oil debris sensors in a conventional manner such as described in U.S. Pat. No. 5,315,243. However, the target signals 50 and 54 of the non-ferrous particles are recovered by removing the noise and vibration signal components in accordance with the above-described technique.

Figure 10:
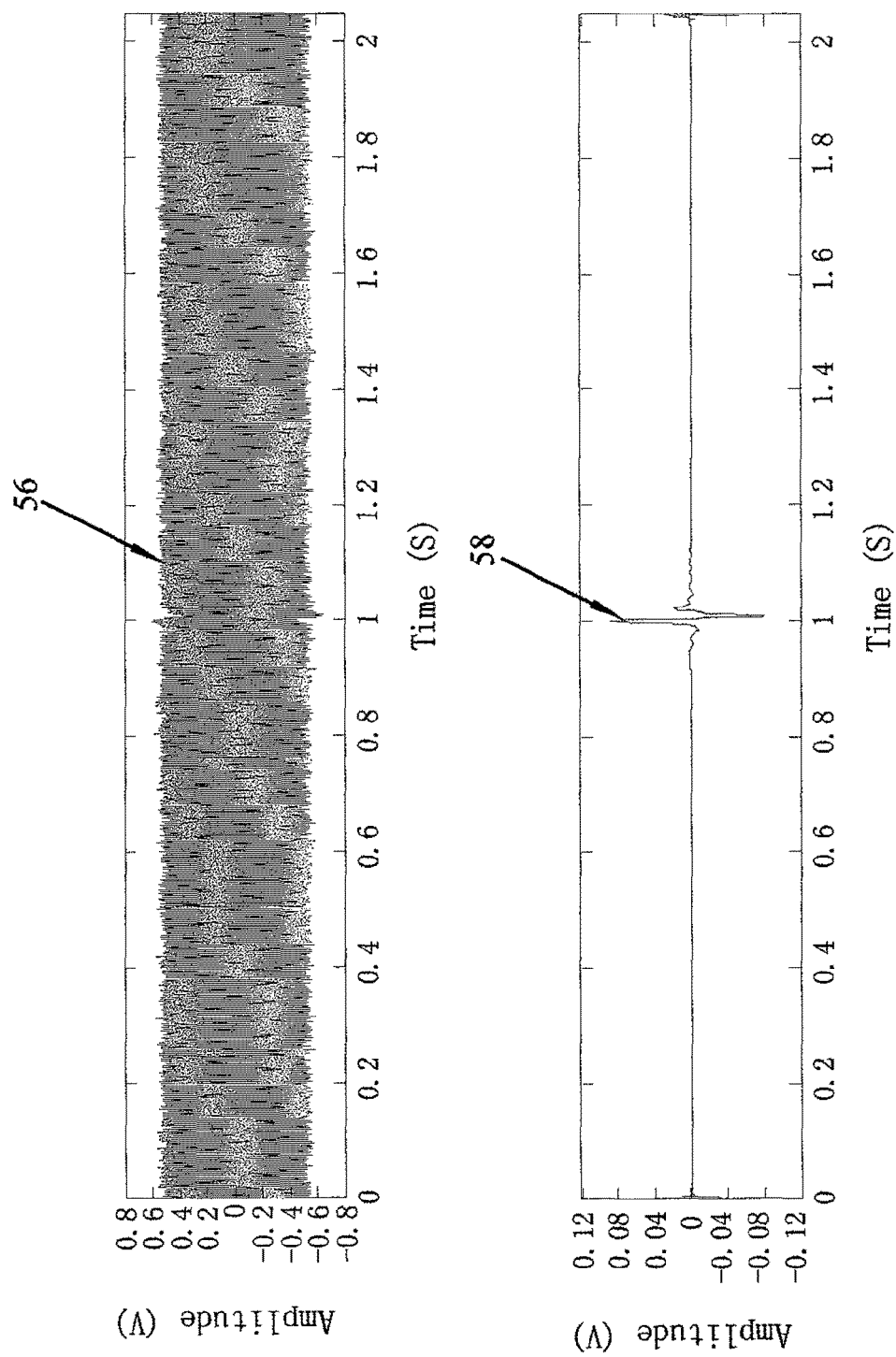
FIG. 10 is a graphical illustration of extraction of a ferrous particle signature from a sample signal collected from an in-line oil debris sensor mounted on a shaker.

FIG. 10 illustrates a further example of the digital filtering result using the method developed in this technique. A target signal 58 of a ferrous particle of size 125 µm is submerged in the original signal sample 56 and as a result of the filtering according to the invention, is recovered.

Figure 11:
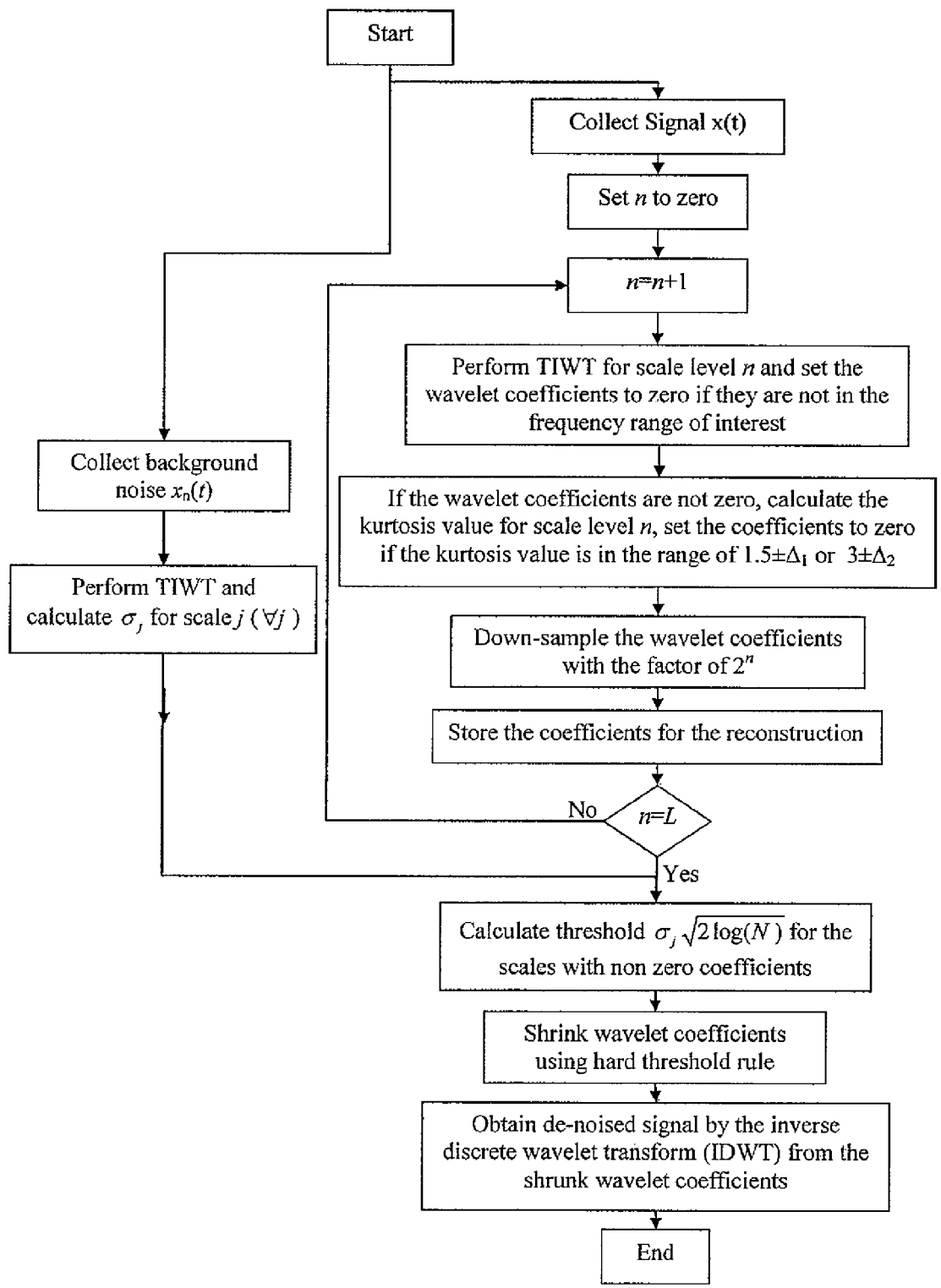
FIG. 11 is a block diagram showing another embodiment for de-noising a collected sample signal and recovering a desired signature, which is preferred if memory capacity is limited.

FIG. 11 illustrates another de-noising algorithm in accordance with another embodiment. Modification has been made to the de-noising algorithm illustrated by the flow chart of FIG. 6, in order to reduce the microprocessor memory required to accommodate many data samples during the decomposition process for on-line applications. The embodiment shown in FIG. 6 provides better enhancement performance than the embodiment of FIG. 11, if memory capacity permits. However, if the memory capacity is limited, the embodiment of FIG. 11 is preferred.

In the version of TIWT analysis as shown in FIG. 11, following the calculation of kurtosis value, the wavelet coefficients resulting from every decomposition step are downsampled. Down-sampling is performed according to the level number. For example if the kurtosis value is in the accepted range and it is decided to use the $n^{th}$ decomposition level for the reconstruction purpose, such coefficients will then be down-sampled with the factor of $2^n$. With this approach the same memory space as the number of acquired samples is needed. The reconstruction would be performed in a way similar to the inverse discrete wavelet transform (IDWT). In comparison to the algorithm shown in FIG. 6, the memory space saving is (L−1)S, where L=the number of decomposition levels and S=the number of samples. The aspects of FIG. 11 similar to those of FIG. 6 will not be redundantly described.

The enhanced ability of oil debris sensors in detecting very small particles provides better responsiveness to machinery fault signals and makes it possible to issue warnings at a much earlier stage. The added capacity in eliminating vibration or vibration-like spurious signals can improve the quality of maintenance decisions and thus reduce false alarms in fault detection.

In the described method, the accuracy of the analysis results depends, to a certain extent, on the calculation of kurtosis. If the size of wavelet coefficients decreases, the accuracy of kurtosis will decrease accordingly. This weakness can be compensated for by jointly using TIWT in the algorithm because the TIWT can effectively maintain constant wavelet coefficient size and hence the accuracy of kurtosis can be preserved.

Modifications and improvements brought about by above-described embodiments may become apparent to those skilled in the art. For example, the general principles of the above-described embodiments are not limited to the processing of transient signals generated by sensors for the detection of particles in fluid flow. The principles of the above-described embodiments may be applicable to data processing in other situations where finite-duration target signals of known characteristics must be identified from raw data input source signal in a time domain containing an unknown number of the target signals and unwanted interfering or noise signals. The invention in this broader form could, in principle, be applied to: acoustic data analysis for detection of finite duration target signals such as animal calls, mechanical acoustic signals relating to machine fatigue or failure, gunshots; optical signals for detection of emboli (gas bubbles) in blood transfusion lines; acoustic or electronic signals for the detection of switching noise in communication lines; electronic signals associated with radar or sonar; cleaning of 'pop' noise in musical recordings, and other applications. The foregoing description is intended to be exemplary rather than limiting.

We claim:

1. A method for extracting intermittent, randomly occurring transient target signals of known type from a raw data source signal containing an unknown number of the target signals in addition to interfering signals or intrinsic noise signals, the method comprising:
    a) obtaining the raw data source signal from a sensor for detecting the passage of particles or bubbles in a fluid flow, wherein a target signal is generated by the sensor when detecting a particle or bubble;
    b) defining quantifiable signatures or characteristics that respectively and independently represent the target signals, the interfering signals or the intrinsic noise signals, wherein the signatures comprise a frequency range of the target signals and a kurtosis value range of wavelet coefficients of respective wavelet scales of interest that reflect a transient nature of the target signals;
    c) applying a Time-Invariant Wavelet Transform (TIWT) to decompose the raw data source signal into distinct data sets in a form of wavelet coefficients of the respective wavelet scales;
    d) processing said data sets to identify a first group of data sets which display the signatures or characteristics representing the interfering signals or intrinsic noise signals and a second group of data sets which display the signatures or characteristics representing the target signals;
    e) setting the data sets of the first group to zero; and
    f) applying an inverse transform to the processed data sets in order to reconstruct a processed output signal.

2. The method as defined in claim 1 wherein step (d) further comprises removing any intrinsic noise signals which remain in the data sets of the second group.

3. The method as defined in claim 1 wherein the signatures comprise two kurtosis value ranges of the wavelet coefficients of each wavelet scale that correspond to the interfering signals and correspond to the intrinsic noise signals, respectively.

4. The method as defined in claim 2 comprising employing a thresholding rule to process the data sets of the second group in order to reduce the intrinsic noise signals.

5. The method as defined in claim 1 wherein an Inverse Time-Invariant Wavelet Transform (ITIWT) is applied to the processed data sets for reconstructing the processed output signal.

6. The method as defined in claim 1 wherein the raw data source signal comprises acoustic signals.

7. The method as defined in claim 1 wherein the raw data source signal comprises optical signals.

8. The method of claim 1 in which the raw data source signal is obtained from sonar or radar apparatus.

9. The method as defined in claim 1 wherein the raw data source signals comprise electronic signals.

10. The method as defined in claim 1 wherein the frequency range of the target signals is determined from information relating to a physical dimension of the sensor and a velocity of the fluid flow.

11. The method as defined in claim 1 wherein the raw data source signal obtained from the sensor is decomposed into a number of scales so that a frequency band width of a highest scale is smaller than a lowest frequency of the target signals.

12. The method as defined in claim 1 wherein the identifying process of the data sets comprises calculating a kurtosis value for each wavelet scale of the raw data source signal and then comparing the same with the kurtosis value range of the wavelet coefficients associated with the defined signatures of the target signals, thereby identifying the respective first and second group of data sets.

13. The method as defined in claim 12 wherein wavelet coefficients in respective wavelet scales are down-sampled prior to an inverse transform according to a decomposition level, following a kurtosis value calculation in the respective scales of said raw data source signal, in order to reduce memory requirement in hardware implementation.

14. The method as defined in claim 13 wherein the inverse transform is an Inverse Discrete Wavelet Transform (IDWT).

15. A method of enhancing the capability of a sensor for sensing a particle or bubble in a fluid flow, the sensor being adapted for generating transient target signals when particles or bubbles in the fluid pass through the sensor, the method comprising steps of:
  a) defining quantifiable signatures of the target signals, having a known frequency range of the target signals and a known kurtosis value range of wavelet coefficients of respective wavelet scales of interest that reflect a transient nature of the target signals;
  b) defining quantifiable signatures of interfering signals and intrinsic noise signals, having two known kurtosis value ranges of wavelet coefficients of each wavelet scale that correspond to the interfering signals and correspond to the intrinsic noise signals, respectively;
  c) obtaining a raw data sample signal in a time domain from the sensor in use for monitoring the fluid flow;
  d) applying a Time-Invariant Wavelet Transform (TIWT) to said raw data sample signal to effect a decomposition of said raw data sample signal into a plurality of data sets in a form of wavelet coefficients of respective wavelet scales;
  e) processing the data sets to calculate a kurtosis value for each data set to compare the kurtosis value for each data set with the kurtosis value range defined in step (a) or the kurtosis value ranges defined in step (b), in order to identify a first group of data sets which display the signatures representing the interfering signals and the intrinsic noise signals and a second group of data sets which display the signatures representing the target signals, and then setting the data sets of the first group to zero;
  f) applying a thresholding rule to process the data sets of the second group in order to reduce any intrinsic noise signals which remain in the data sets of the second group; and
  g) constructing a processed output signal by applying an inverse transform to the data sets processed in steps (e) and (f).

* * * * *